(12) United States Patent
Durand et al.

(10) Patent No.: US 7,588,270 B2
(45) Date of Patent: Sep. 15, 2009

(54) THREADED TUBULAR JOINT COMPRISING SEALING SURFACES

(75) Inventors: Antoine Durand, Valenciennes (FR); Andrei G. Filippov, Ab Rijswijk (NL)

(73) Assignee: Vallourec Mannesmann Oil & Gas France, Aulnoye Aymeries (FR)

(*) Notice: Subject to any disclaimer, the term of this patent is extended or adjusted under 35 U.S.C. 154(b) by 149 days.

(21) Appl. No.: 10/499,820

(22) PCT Filed: Dec. 24, 2002

(86) PCT No.: PCT/FR02/04545

§ 371 (c)(1), (2), (4) Date: Jul. 2, 2004

(87) PCT Pub. No.: WO03/060369

PCT Pub. Date: Jul. 24, 2003

(65) Prior Publication Data
US 2005/0212290 A1  Sep. 29, 2005

(30) Foreign Application Priority Data
Jan. 3, 2002 (FR) ................................. 02 00053

(51) Int. Cl.
*F16L 15/00* (2006.01)
(52) U.S. Cl. ..................... 285/390; 285/333
(58) Field of Classification Search ............. 285/390, 285/355, 333, 334, 382, 915, 382.4, 382.5
See application file for complete search history.

(56) References Cited

U.S. PATENT DOCUMENTS

| | | | |
|---|---|---|---|
| 1,884,551 A | 10/1932 | Boynton | |
| 2,258,066 A | 10/1941 | Oyen | |
| 3,489,437 A | 1/1970 | Duret | |
| 3,870,351 A | 3/1975 | Matsuki | |
| 4,009,893 A | 3/1977 | Schatton et al. | |
| 4,474,651 A * | 10/1984 | Yauchi et al. | 285/329 |
| 4,611,838 A | 9/1986 | Heilmann et al. | |
| 4,619,472 A | 10/1986 | Kozono et al. | |
| 4,629,221 A | 12/1986 | Lumsden et al. | |
| 4,732,416 A | 3/1988 | Dearden et al. | |
| 5,078,430 A | 1/1992 | St. Onge | |
| 5,154,452 A | 10/1992 | Johnson | |
| 5,462,315 A | 10/1995 | Klementich | |
| 5,681,059 A | 10/1997 | Mackie | |
| 5,709,416 A | 1/1998 | Wood | |
| 5,765,836 A | 6/1998 | Banker et al. | |

(Continued)

FOREIGN PATENT DOCUMENTS

EP  0329990  8/1989

(Continued)

*Primary Examiner*—Aaron M Dunwoody
(74) *Attorney, Agent, or Firm*—Oblon, Spivak, McClelland, Maier & Neustadt, P.C.

(57) ABSTRACT

A tubular joint for hydrocarbon wells including a male tubular element and a female tubular element including respective sealing faces configured to come into mutual sealing-tight contact after sliding over one another during assembly and/or during radial expansion of the joint. At least one of the sealing faces is equipped with an adhesive coating of a more ductile material than the material of the substrate and of a thickness greater than 17 μm, capable of increasing the effective contact area of the sealing faces.

2 Claims, 4 Drawing Sheets

U.S. PATENT DOCUMENTS

| | | | |
|---|---|---|---|
| 5,964,486 A | 10/1999 | Sinclair | |
| 6,047,997 A | 4/2000 | Olivier | |
| 6,322,110 B1 * | 11/2001 | Banker et al. | 285/334 |
| 6,428,858 B1 * | 8/2002 | Bolton et al. | 427/449 |
| 6,485,063 B1 | 11/2002 | Olivier | |

FOREIGN PATENT DOCUMENTS

| | | |
|---|---|---|
| EP | 0570657 | 11/1993 |
| JP | 06-346988 | 12/1994 |
| WO | WO 99/08034 | 2/1999 |
| WO | WO 01/04520 | 1/2001 |

* cited by examiner

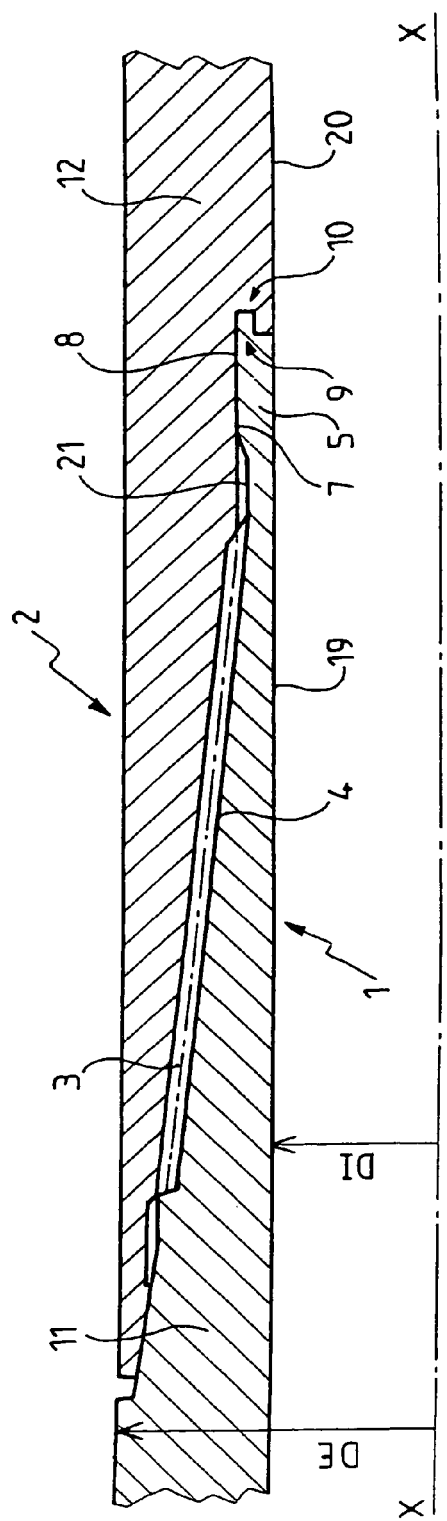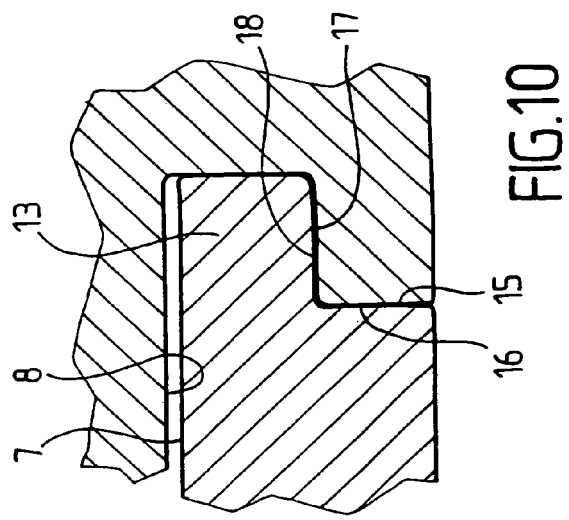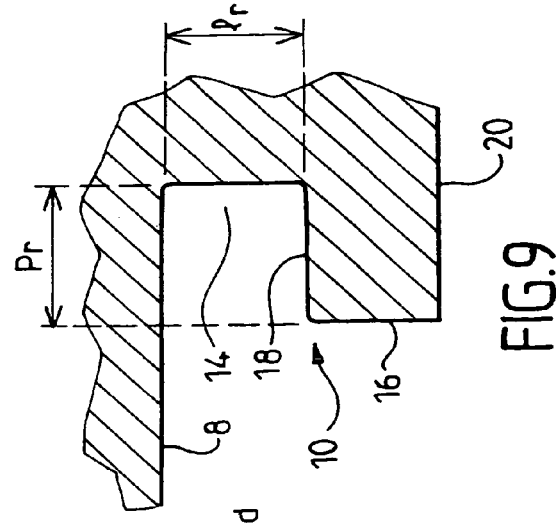

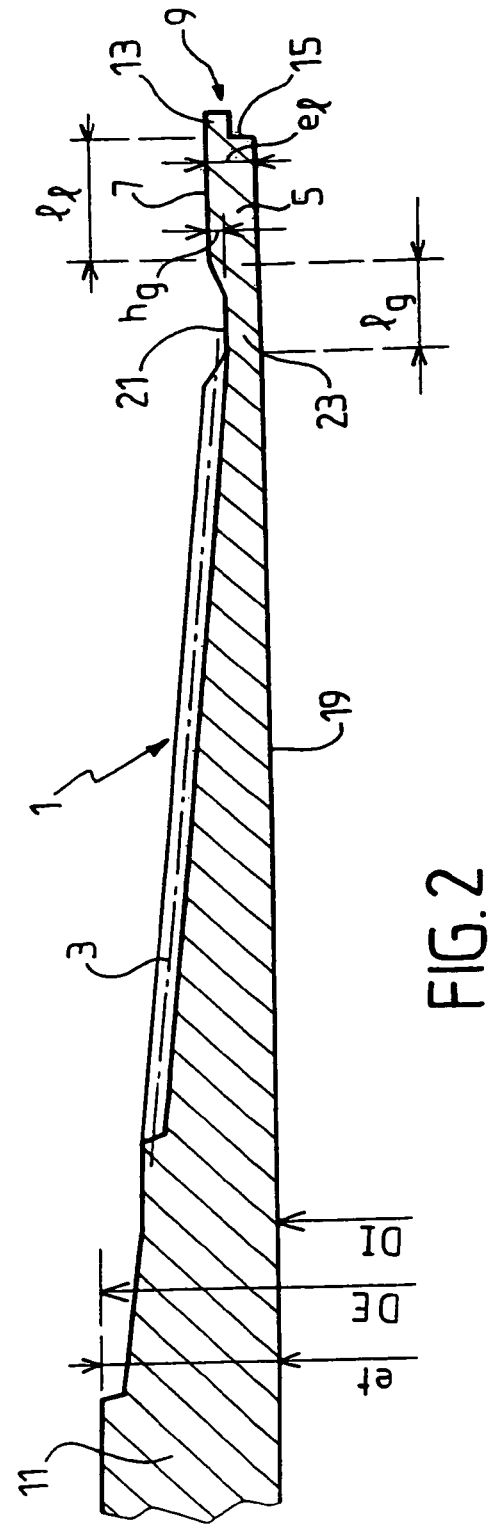
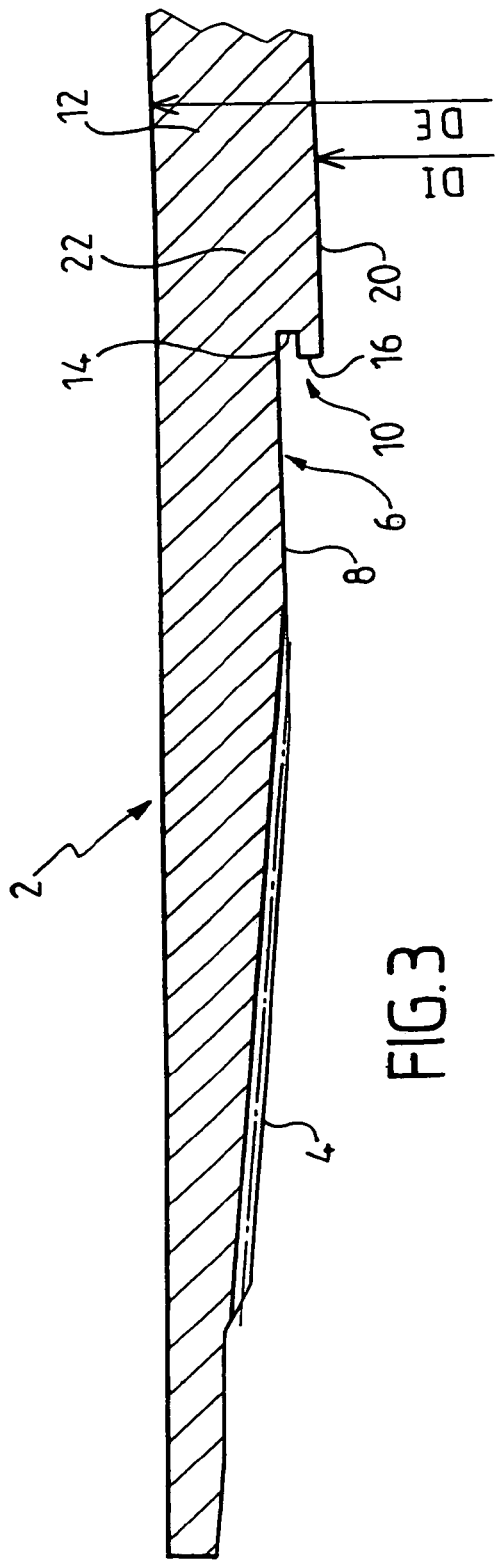

THREADED TUBULAR JOINT COMPRISING SEALING SURFACES

BACKGROUND OF THE INVENTION

1. Field of the Invention

The invention relates to a tubular joint, in particular of the type used for hydrocarbon wells or the similar wells, e.g. in the field of geothermics.

2. Description of the Related Art

Such a joint may exist between two large-length tubes or between a large-length tube and a coupling. These joints are used in particular for assembling strings of casings or tubings. Taking into account the mechanical features required, the casings and tubings are generally composed of heat-treated steel.

For their part, the joints must withstand tension, compression, bending and sometimes twisting as well as widely differing pressure in both directions between the inside and the outside. Furthermore, they must even be gas-tight, at least in certain cases. Threaded joints are particularly advantageous in this respect.

However, it is currently intended to subject the tubes in situ to diametric expansion with permanent plastic deformation. This has various advantages, which will be referred to below. Again it is necessary that the joints remain operational after the plastic deformation due to diametric expansion to which they are subjected like the tubes. Thus it is desirable that the threaded joints hold after plastic diametric expansion whilst substantially retaining the features for which they are valued, in particular mechanical strength under tension/compression, with or without internal or external high pressure, as well as sealing-tightness.

As will be seen below in detail, the conventional joints are not entirely satisfactory: either they do not meet these requirements, or they meet them in a random manner, or they meet them, but not in a repeated manner.

In the not yet published international application PCT/FR01/02005 by the Applicants, a joint structure is proposed which is intended to withstand plastic diametric expansion.

The sealing-tightness of the tubular joints depends on the effective contact area of the sealing faces, which is affected by the presence of irregularities resulting from the machining of these surfaces. Furthermore, these irregularities are apt to be pulled off when the sealing faces of the two tubular elements slide over one another during assembly of the joint, and likewise during radial expansion where this is provided, thus causing further deterioration of the quality of their contact.

SUMMARY OF THE INVENTION

The object of the invention is to solve these problems entirely or in part.

The invention relates to a tubular joint comprising a first tubular element and a second tubular element capable of being assembled together with insertion of a first region of the first tubular element in a second region of the second tubular element, the said first and second regions comprising respective sealing faces capable of coming into mutual sealing-tight contact in a final state of the joint after radial expansion thereof.

In this case, "sealing-tight contact" is taken to mean contact between two surfaces pressed strongly together so as to effect metal-to-metal sealing-tightness.

The invention proposes in particular that at least one of the sealing faces is equipped with an adhesive coating comprising a more ductile material than the material of the substrate and having a thickness of more than 17 μm, capable of increasing the effective contact area of the sealing faces.

Optional, complementary or alternative features of the invention are listed below:

The thickness of the coating is at least 20 μm

The thickness of the coating is between 35 and 50 μm.

For a steel or nickel-alloy substrate, the more ductile material is selected from copper, lead, zinc, tin and their alloys.

The first and second tubular elements are capable of being mutually assembled by screwing a male thread of the first tubular element into the female thread of the second tubular element.

The threads are conical, having a conicity of at least 12.5%.

The threads are cylindrical with at least two stages of different diameters.

Each of the sealing faces is located between two stages of thread.

The first region comprises an annular part having a projecting stop face and the second region comprises a housing, homologous to the annular part, having a receding stop face, the two stop faces allowing the torque produced by screwing together of the first and second threads to be controlled and the first region to be inserted into the second region.

The outer peripheral surface of the annular part is disposed with slight clearance from the inner peripheral surface of the housing.

The sealing faces respectively form part of the outer peripheral surface of the annular part and of the inner peripheral surface of the housing.

The first region is located at the free end of the first tubular element, the annular part forming a lip.

The projecting stop face comprises an annular tongue projecting axially and a transverse face connecting the annular tongue to the radially inner face of the first tubular element and the receding stop face comprises an annular groove and a transverse face connecting the annular groove to the radially inner face of the second tubular element, the tongue engaging in the groove and the transverse face of the projecting stop face coming opposite the transverse face of the receding stop face.

The outer peripheral face of the annular tongue is an extension of the outer peripheral face of the annular part and the inner peripheral face of the annular groove is an extension of the inner peripheral face of the housing.

The radial thickness $e_d$ of the tongue is substantially equal to that of the transverse face of the receding stop face.

The ratio between the height measured axially $h_d$ of the tongue 13 and its radial thickness $e_d$ is between 0.8 and 1.6.

The height measured axially $h_d$ of the tongue is between 0.8 and 3 mm.

The axial height $h_r$ of the tongue and the axial depth $P_r$ of the groove are such that, upon screwing together of the threaded joint, the first stop contact takes place between the free transverse end of the tongue and the bottom of the groove.

The male element has a groove at the end of the male thread between the thread and the male lip.

The groove has a depth $h_g$ at most equal to the height of the male threads.

The groove has a total axial width $l_g$ and a depth $h_g$ such that its axial width is between 2 and 15 times its depth.

During plastic deformation, the sealing faces bind on to one another over their entire circumference.

The diametric expansion undergone by the tubular threaded joint is at least equal to 10%.

The invention also relates to a method of realising a sealing-tight tubular threaded joint characterised in that one starts off with a tubular threaded joint such as defined above, known as an "initial tubular threaded joint", and this initial threaded joint is then subjected to diametric expansion in the sense of plastic deformation with the aid of an expansion bullet of greater diameter than the inner diameter DI of the tubular elements of the threaded joint which is displaced axially in the threaded joint, the male lip and the female housing being so dimensioned as to undergo at first plastic bending deformation together, as the bullet passes through, whereas only the female housing then undergoes plastic deformation in the opposite direction of straightening, which finally binds a sealing face of the annular part of the male lip by a sealing face of the female housing.

The method according to the invention may comprise at least some of the following features:

Bending of the male lip is defined by the presence of a groove at the end of the male lip on the side of the male thread.

The tubular threaded joint used is of the integral type and the expansion bullet is moved from the male threaded element to the female threaded element.

BRIEF DESCRIPTION OF THE DRAWINGS

The features and advantages of the invention will be disclosed in more detail in the following description, with reference to the attached drawings.

FIG. 1 shows a threaded joint according to the invention before diametric expansion.

FIG. 2 shows the male element of the threaded joint of FIG. 1.

FIG. 3 shows the female element of the threaded joint of FIG. 1.

FIG. 4 shows the expansion phase of the threaded joint.

FIG. 5 shows the bending phase.

FIG. 6 shows the straightening phase.

FIG. 7 shows the final state of the threaded joint having undergone the expansion process.

FIGS. 8 and 9 show on a larger scale the details of the lip and the housing shown in FIGS. 2 and 3 respectively.

FIG. 10 shows on a larger scale a detail of FIG. 1.

DETAILED DESCRIPTION OF THE PREFERRED EMBODIMENTS

Figure 4:
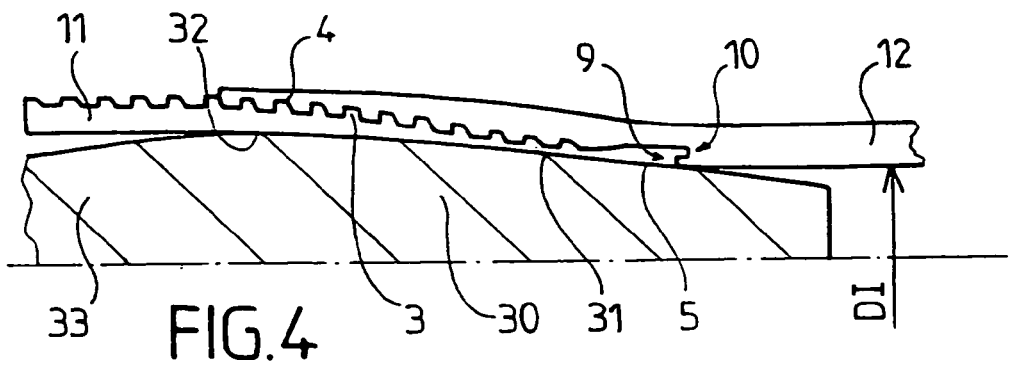
FIGS. 4 to 7 show the threaded joint according to the invention at various stages in the expansion process.

We refer here to the drilling of wells for hydrocarbons or geothermics for example.

Conventionally, the top of a well is first drilled to a relatively small depth of several tens of meters by means of a large-diameter tool, e.g. 500 mm wide, and is lined with a string of tubes of this diameter. The drilling diameter then decreases by steps until the bottom of the well, which may be drilled with a substantially smaller diameter of 150 mm in the same example. Such a well is then lined with plural strings of concentric tubes, each lowered at the end of drilling to the corresponding diameter and all suspended from the surface; the tubes of largest diameter extend from the surface to several tens of meters deep, and the tubes of the smallest diameter extend from the surface to the bottom of the well, whose depth may reach several thousand meters. The space between the casings and the earth is filled with cement for example.

After the well has been completely drilled and lined, a string of tubings can be lowered in order to allow in particular the rising of hydrocarbons to the surface, i.e. actual mining of the well. Obviously this string of tubings has an outer diameter which is slightly smaller than the inner diameter of the string of casings.

To equip a well therefore leads to the installation of a large number of tubes of various dimensions, usually connected by means of threaded joints taking into account the advantages of this type of connection. It is desired to make these tubes as slim as possible in order to avoid over-large diameters of casings near the surface. This is because keeping within the constraints and specifications applicable to threaded joints often leads to their having a larger thickness than that of the conducting part of the tubes, and this makes it imperative to increase the diametric progression between concentric strings when descending deep down into the well.

The connecting together of tubes is effected either by screwing the threaded ends of the tubes into one another (known as integral joints), or by means of threaded couplings covering their ends. The tubes are lowered consecutively after being screwed into the end of the preceding tube or coupling.

The specification API 5 CT of the American Petroleum Institute (API) thus defines tubular threaded joints between two large-length tubes ("integral-joint tubing", "extreme-line casing"), as well as coupled threaded connections comprising two threaded joints for assembling two large-length tubes by means of a coupling. These API joints are only made sealing-tight by the application of a grease charged with metal particles, which fills the gaps between threads.

Obviously the links between tubes (or between tubes and couplings) must remain sealing-tight whatever the stresses to which the tubes are subjected during their descent into the well and during operation, and within a wide range of mass supported, since each joint supports at least in part the tubes located above itself. Furthermore, the mechanical performance indicators of the threaded joints seem to be closely linked to their geometric characteristics.

In standard threaded joints according to API, there is always, in spite of the use of grease charged with particles, a leak channel into which a fluid under high pressure can circulate due to the play between the non-contacting surfaces. For a tension load, there is a fluid pressure threshold beyond which the combined effort of tension and pressure causes the API threaded joints first to develop a leak, which may lead to unmeshing of the threads of the male and female parts in mutual contact.

The threaded joints and connections have to this end been the subject of various improvements: for example, the patents FR 1489013, EP 0488912, U.S. Pat. No. 4,494,777 have aimed to create what are known as superior or 'premium' tubular threaded joints which are particularly sealing-tight by virtue of metal-to-metal bearing areas interfering radially one on another and of stops between male and female elements which are judiciously arranged so as to ensure a specified range of interference between sealing areas.

As indicated, after lowering of a tubular string into a well, it is intended to subject this to diametric expansion with permanent plastic deformation. This is effected for example by means of a bullet which is forced to pass inside the string: see patents or patent applications WO 93/25799, WO 98/00626, WO 99/06670, WO 99/35368, WO 00/61915, GB 2344606, GB 2348657. This offers the following advantages:

of lowering a string of low bulk, which is then forcibly expanded;

of thus installing a string of casings, in the same manner, of sealing in situ the holes of a casing or tubing pierced by corrosion or friction of the drilling rods, or even of lowering into the well low-bulk tubes which will be expanded to the desired diameter once in place, finally and above all, of permitting the drilling of wells of a uniform diameter over their entire length, whose casing is realised by a string of tubes all of the same diameter, parts of strings being inserted in the non-expanded state, then being expanded in situ to the diameter of parts of expanded strings already in place and joined end to end therewith.

It would therefore be possible substantially to decrease the number of tubes necessary to equip a well, by eliminating the larger-diameter tubes having a greater thickness. The cost of the well is consequently reduced. It is even conceivable to drill the well directly with the string of casings, which would act as a guide for the drilling rods.

It has been found that realising threaded joints which retain their performance after expansion which may exceed 10%, and even reach 25%, is extremely difficult, especially as this must be reliable (all the joints must hold) and stable in operating conditions.

It is known from U.S. Pat. No. 5,924,745 and WO 98/42947 to form threaded connections that withstand expansion, but the tubes connected here are known as EST (expandable slotted tubings), equipped with through longitudinal slots and subject to diametric expansion at the bottom of the hydrocarbon well (by passing an expansion mandrel through the tubes); once widened, the slots allow a fluid outside the tube (hydrocarbon from the deposit) to enter the tube in order to rise to the surface. In this case, the sealing-tightness of the connections is clearly not important, and being at the bottom of the well, they are not subject to such a high mechanical stress.

Indeed, the first proposals of plastic expansion of sealing-tight tubular strings are based on welded joints (windings of tubes made to abut in advance by soldering, which windings slip from the surface) or 'slips'. But such joints do not have the performances of threaded joints, particularly as regards the combination of mechanical strength, sealing-tightness in all conditions of operation, and also the possibility of dismantling/reassembling several times in succession.

It has been found that the conventional tubular threaded joints such as those according to the U.S. Pat. No. 4,494,777 do not withstand plastic diametric expansion. After expansion on these joints, the following is found:

an absence of sealing-tightness (which consequently makes it impossible to effect expansion by pushing the bullet hydraulically through the string);

tapering of the male end towards the inside of the joint, which considerably reduces in an unacceptable manner the inner functional diameter of the string by forming an internal projection into the space defined by the inner functional diameter;

possibly rupture of the lip of the male end by exceeding the capacity for deformation of certain regions which are particularly stressed due to the variations in thickness along the length of male and female elements relative to the thickness in the body of the tube.

It has therefore been tried to form a tubular threaded joint which is capable of withstanding the expansion operation in the well and which is sealing-tight to liquids and if possible to gases after the expansion operation. It has also been tried to make the tubular threaded joint simple and economical to produce. It has further been tried to give the threaded joint excellent metallurgical properties during operation therefore after expansion, in particular in that it has in this state a sufficient elastic limit that it is free of fragility and that it has excellent resistance to cracking under constraint by $H_2S$.

Threaded joints are known having a male lip corresponding to a female housing (U.S. Pat. No. 4,611,838, U.S. Pat. No. 3,870,351, WO 99/08034, U.S. Pat. No. 6,047,997). It has been found that these known connections have no sealing-tightness after plastic expansion, but in any case this is in no way intended.

An embodiment of a metal-to-metal sealing joint in the form of a finger adapted to this technology is disclosed in the international patent PCT/FR01/02005 cited above. However, for this embodiment, for the highest expansion rates, the mechanical stresses to which the tubes are subjected during passage of the bullet disengage the finger from its housing, leading to insufficient sealing-tightness or even an absence of sealing-tightness at the joints.

FIG. 1 shows a joint having a male threaded element 1 disposed at the end of a first tube 11. This male element is screwed into abutment with a female threaded element 2 disposed at the end of a second tube 12. The inner diameter of the male threaded element is in this case equal to the inner diameter DI of the tubes 11, 12. In the embodiment of FIG. 1, the outer diameter of the female threaded element is equal to the outer diameter DE of the tubes 11, 12 only by way of example.

The joint in FIG. 1 is shown in the state of being simply screwed into abutment before any diametric expansion operation.

The second tube 12 as shown is a large-length tube. This second tube could be, in a manner not shown, a coupling equipped on one side with the female element 2 and on the other side with a second female element which may or may not be symmetrical to the latter and which is screwed to a male element located at the end of another large-length tube.

Only the male element 1 is shown in FIG. 2.

It comprises a male thread 3, which is conical with trapezoid thread cross-section, and extends to its free end by a non-threaded part formed by a groove 21 and by a lip 5 and ends with an annular face of the male end 9.

The groove 21 has a shallow U-shape.

It starts immediately beyond the thread and its depth $h_g$ relative to the outer face of the lip is lower than the height of the ridges of the thread 3. In this manner, the bottom of the groove reaches the foot of the first turn of the thread and joins the lip by a slightly inclined side.

The total width of the groove $l_g$ at its peak is substantially equal to 4 times its depth $h_g$.

The lip 5 has:

a) an outer peripheral face 7 of cylindrical form, b) an inner peripheral face 19 which corresponds to the end region of the cylindrical inner peripheral face of the first tube 11.

The lip 5 therefore has a uniform thickness $e_1$ substantially equal to half the thickness $e_t$ of the tube 11. It has a length $l_l$ measured from the end of the groove to the perpendicular of the surface 15 (defined below) substantially equal to 3 times the lip thickness $e_1$.

The male end surface 9 forms a rebate. This rebate is formed of a male annular transverse face 15 and an annular tongue 13 projecting axially, adjacent to the transverse face 15. The male transverse face 15 is located on the side of the rebate oriented towards the interior of the threaded joint.

The outer peripheral face of the tongue 13 is an extension of the face 7 of the lip, whereas its inner peripheral face 17 is cylindrical for example.

The radial thickness of the tongue 13 is substantially identical to that of the transverse face 15, whereas the height of the tongue (or axial projection thereof) is substantially equal to the radial thickness of the tongue. It may also be equal to 1.5 times this radial thickness in order better to retain the free end of the tongue during expansion.

The female element 2 is shown alone in FIG. 3.

It comprises, from the free end of the female element, a female thread 4 with trapezoidal ridges homologous to the male thread 3, then a non-threaded part 6. This non-threaded part 6 forms a housing to correspond to and cooperate with the lip 5 of the male element 1.

The female housing 6 has a peripheral face 8 turned inwards, of cylindrical shape, connected on one side to the female thread 4 and on the other side via a female shoulder 10 to the inner cylindrical peripheral face 20 of the second tube 12.

In general, the diameter of the peripheral face 8 of the housing is very slightly larger than the diameter of the outer peripheral face 7 of the male lip 5. Thus the faces 7 and 8 can slide into one another with little clearance during screwing of the male element into the female element, e.g. with a clearance of 0.2 mm. The advantage of such sliding will be explained below.

The female shoulder has an annular shoulder face 10 which is disposed substantially correspondingly and which has a shape substantially similar to that of the male end 9. The face 10 forms a rebate consisting of a female transverse annular face 16 and an annular groove 14 adjacent to the transverse face 16.

The female transverse face 16 is located on the side of the rebate oriented to the interior of the threaded joint. The wall 18 of the groove 14 adjacent to the transverse face 16 is cylindrical for example and can join thereto by a chamfer or rounded edge. The opposite wall of the groove is an extension of the peripheral face 8. During screwing together of the threaded joint, the face 17 of the tongue 'rises' over the wall 18 of the groove until the free transverse end of the tongue extends against the bottom of the groove 14. The axial height $l_r$ of the tongue 14 and the axial depth $P_r$ of the groove are such that the transverse faces 15 and 16 do not come into contact until after further screwing. The small clearance between the cylindrical faces 7 and 8 and between the faces of the tongue and the groove which are an extension of them therefore permits evacuation of the grease at the end of screwing and therefore correct positioning of the lip 5 relative to the housing 6.

FIGS. 4 to 7 illustrate the deformation phenomena produced when diametric expansion of 15% is realised by means of a bullet on the tubes connected by the threaded joints which have just been described and which ultimately permit a sealing-tight expanded joint.

Such deformation carried out on metal materials leads to plastic deformation of the metal.

Thus for example one passes from an outer diameter of 139.7 mm (5.5 in) on the second tube 12 upstream of expansion, and consequently in the part not yet deformed, to an outer diameter of 157.5 mm (6.2 in) on the first tube 11 expanded (perpendicular to or downstream of the exit cone 33 of the bullet).

It is therefore imperative to use for the tubes a metal which allows such plastic deformation.

The plastic deformation generated increases the yield strength of the products: a tube having initially a yield strength of 310 MPa (45 KSI) will have this increased to 380 MPa (55 KSI) after deformation.

The diametric expansion is carried out in a known manner by means of a bullet 30 (FIG. 4) of adequate maximum diameter. The bullet is forced through the tubes either by pulling with the aid of drill rods or by pushing by hydraulic pressure, for example.

The bullet has for example a biconical shape with an entry cone 31 on which the expansion is carried out, a middle cylindrical part 32 and an exit conical part 33. All the surfaces of the parts of the bullet are joined together by adapted connection radii.

WO 93/25800 discloses in particular angles of entry cones especially adapted to the diametric expansion of tubes known as EST for the mining of hydrocarbon wells.

Since the tubes 11, 12 have a substantially constant cross-section, their ends do not create a particular problem during passage of the bullet, provided that the capacity for deformation of the metal of which they are made is sufficient.

The problems to be overcome arise from the fact that the threaded elements at the end of the tubes have thicknesses which are smaller than those of the body of the tubes and which are variable locally, and are supported more or less and tend to deform in different ways between the male parts and the corresponding female parts.

These different deformations, although overcome by using the threaded joint according to the invention, make it possible to realise a sealing-tight threaded joint after diametric expansion which does not have latent local relief inside the inner peripheral surface of the tubes.

The process of expansion of the threaded joint can be broken down into 4 phases which are the subject of FIGS. 4 to 7.

Although the expansion operation can be carried out entirely in the reverse direction and lead to adequate results, the preferred mode of deformation has been shown in which the bullet moves from the male element 1 of the first tube 11 to the female element 2 of the second tube 12.

a) Expansion Phase on the Bullet Cone

FIG. 4 shows the threaded joint during this phase.

The expansion is carried out by the entry cone 31 of the bullet 30 and FIG. 4 shows the male 3 and female threads 4 during diametric expansion.

In FIG. 4, the entry cone 31 of the bullet 30 starts the deformation of the male lip and of the homologous female housing region by bending them in order to incline them relative to the axis of the connection.

During this expansion phase, the reaction forces to the passage of the bullet 30 are progressively transferred from the first tube 11 to the second tube 12.

Due to these reaction forces, the male lip 5 is compressed axially during this expansion phase by the annular face of the female shoulder 10.

The end of the expansion phase corresponds to the arrival of the free end of the male element at the end of the entry cone 31 of the bullet.

b) Bending Phase

Figure 5:
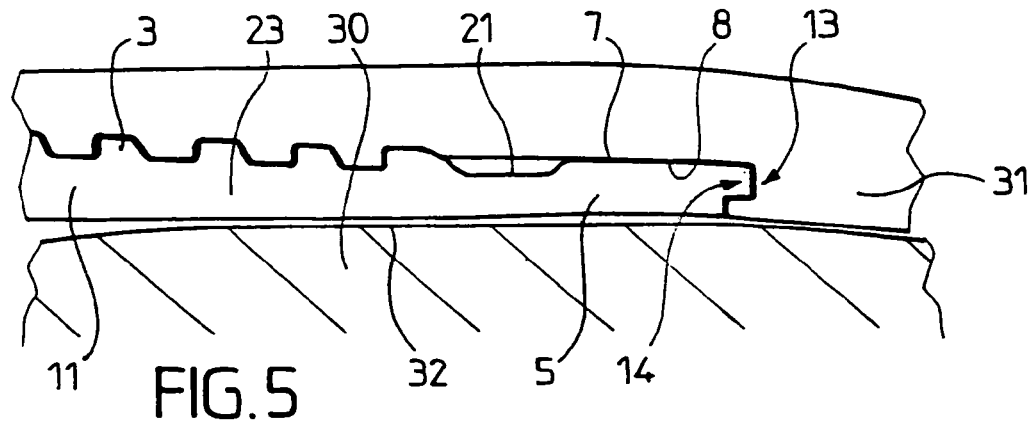

During this phase, the male lip is located level with the central part 32 of the bullet: see FIG. 5.

i) Male Lip

The male lip 5 is subjected at both ends to bending moments in opposite directions.

The male end face 9 is in face kept in position in the female shoulder face 10 due to the rebates with supports 15, 16 and to the system of capture of the tongue 13/groove 14.

The capture of the rebates forces the free end region of the male lip 5 to follow the inclination of the region 22 of full thickness of the female element beyond the shoulder. This region 22 is again in the process of expansion on the entry cone 31 of the bullet and therefore creates a bending moment at this level.

The other end of the lip, on the side of the male thread 3, is no longer supported and on the contrary imposes on the lip a bending moment opposite to that at the free end of the lip.

The bending moments of opposite sign at the two ends of the male lip bring about a banana-shaped curvature of the male lip 5, as in FIG. 5, whilst the outer peripheral face 7 of the lip 5 takes on a convex shape.

The state of axial compression of the male lip 5 after the phase of expansion facilitates its curvature under the effect of the bending moments.

The groove 21 located between the male lip 5 and the male thread 3 acts as a plastic pivot which accentuates the curvature of the male lip by limiting the width over which this curvature can take place.

It should be watched in this case, however, that the axial compression stresses on the male lip do not bring about buckling of the metal 23 under the groove. This buckling would be converted into a projection of the metal under the groove relative to the inner peripheral face 19.

ii) Female Housing

The same bending phenomenon is produced on the female housing.

The region 22 of full thickness which is relatively rigid compared to the relatively slim regions of the lip undergoes additional expansion upon passage of the middle part, such that the inner diameter of the region 22 becomes larger than that of the middle zone 32 of the bullet. The additional expansion phenomenon is described in the specification WO 93/25800.

c) Straightening Phase

Figure 6:
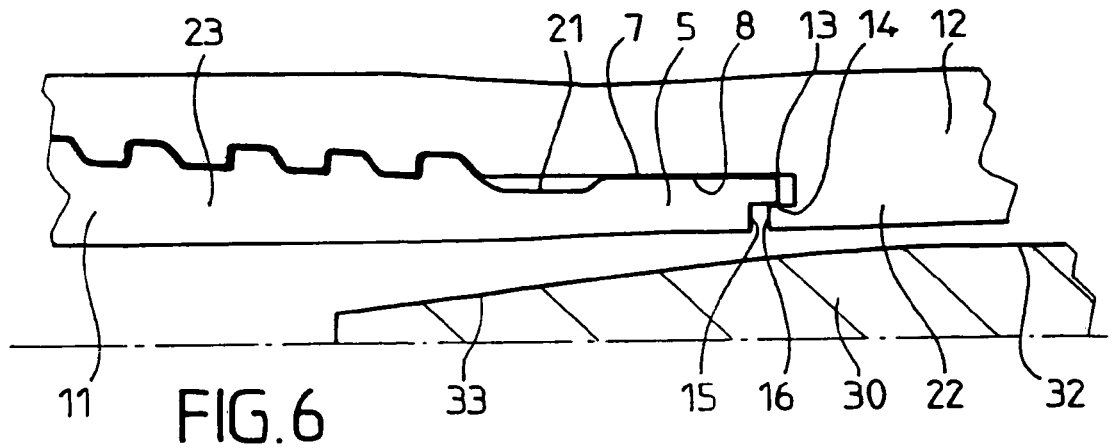

This phase illustrated in FIG. 6 corresponds to the passage of the female region 22 of full thickness over the middle part 32 of the bullet 30.

i) Female Housing

The bending generated in the preceding phase tends to be brought back to zero under the effect of tension and circumferential stresses, which generates an inverse state of axial bending stresses relative to the curvature, thus bringing about straightening.

The bending moment generated by these stresses is proportional to the thickness of the material upstream of the straightening. At the moment of arriving on the tube 12 of full thickness (region 22), the bending moment is not sufficient to straighten the inner peripheral region of the female housing, which then tends to dive towards the axis of the product. This behaviour is manifested by a local reduction of outer diameter of the tube 12.

ii) Male Lip

During the straightening of the female part, the difference in axial bulk which was generated by bending decreases. The male lip 5 therefore progressively loses its compressed state. This is followed by separation of the faces 15, 16 initially abutting. This phenomenon is reinforced by 'the diver' of the inner peripheral face 8 of the female housing which produces an effect of opening of the abutments 15, 16.

The banana-shaped deformation imposed in the preceding phase is conserved.

d) Final State

Figure 7:
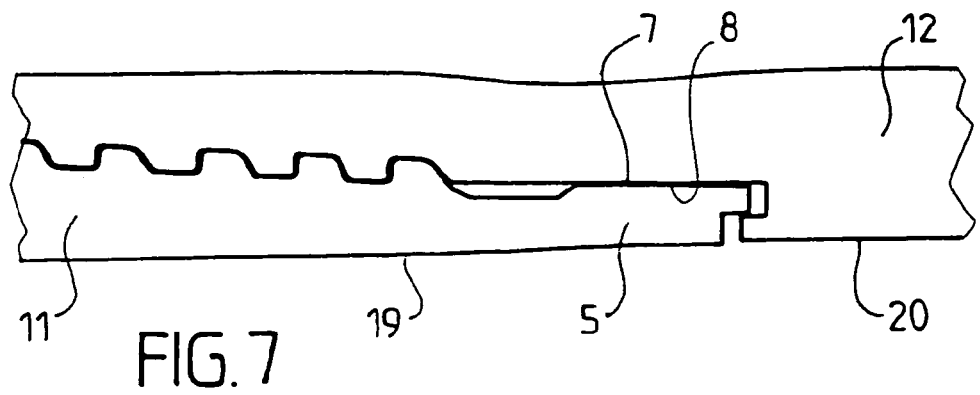

FIG. 7 shows the final state of the threaded joint after passage of the bullet. The state of circumferential stresses generated by expansion leads to binding of the outer peripheral face 7 of the male lip by the inner 8 one of the female housing. One can therefore refer to self-binding of the surfaces 7, 8 of the threaded joint in the expanded state, which ensures sealing-tightness. The male lip 5 does not dive towards the axis, as the radial offset imposed by the capturing of the rebates 9, 10 has generated sufficient plastic deformation.

The elastic return of the elements of the threaded joint after passage of the bullet is negligible compared to the plastic deformation brought about.

The radial binding induces a contact pressure of several tens of MPa, even more than 100 MPa, sufficient to ensure sealing-tightness at the internal or external pressures at the threaded joint. The length of binding is sufficient over the entire periphery of the contact faces to ensure stable sealing-tightness between these contact faces.

Sealing-tightness is further necessary when expansion is carried out by pushing the bullet 30 hydraulically under a pressure of 10 to 30 MPa, and any leak at the joints, which have already been expanded, prevents the bullet from penetrating further forward in the string and consequently blocks the process of expansion.

It should be noted that in the final state, it may occur that the tongue 13 no longer rests in the groove 14.

A male end face 9 which has not been captured in that of the female shoulder 10 causes diving of this end during the straightening phase, which involves separation of the initially abutting transverse faces 15 and 16, giving rise to an unacceptable projection of the lower end of the male lip inside the string. The string therefore does not allow the equipment or tools of a given size to be lowered further.

Too much play between the peripheral face 7 of the male lip 5 and the peripheral face 8 of the female housing on the threaded joint before expansion would not allow the binding of these faces as a result of the expansion operation.

A radial interference between these faces in the initial state before expansion is capable of impeding differential deformations (curvature, straightening) between these faces during the expansion operation. These differential deformations make it possible to effect binding of these faces as a result of the expansion operation. It also risks bringing about galling of these faces during screwing and bad positioning of the elements with incorrect capture of the faces 9 and 10, and consequently a poor interference fit of the faces 7 and 8 after expansion.

In a preferred embodiment, the form with an annular rebate with transverse faces 15, 16 and the tongue 13/groove 14 mechanism makes it possible to prevent diving of the male free end during expansion. Other embodiments of encased faces 9, 10 are possible in order to give the same result.

A too-small male lip 5 of thickness $e_1$ smaller than one third of the thickness and of the tubes 11, 12 does not make for an effective abutment at the transverse faces 15, 16.

If the thickness $e_1$ of the male lip 5 is on the other hand larger than $2/3$ of the thickness and of the tubes 11, 12, the thickness of the tube 12 at the region of the female housing brings about a critical female thread 4 cross-section which is too weak and consequently offers insufficient resistance to tension of the threads.

The ratio of length/thickness of the male lip 5 dictates the behaviour under compression and bending of the lip 5.

A male lip 5 of length $l_l$ smaller than its thickness does not give sufficient bending of the peripheral face 7 of the male lip 5 and/or straightening of the peripheral surface 8 of the female housing.

A male lip 5 of length $l_l$ larger than 4 times its thickness $e_l$ can cause buckling of the male lip and an internal projection thereof on the side of the thread.

This effect is accentuated by the presence of a groove 21 between the male thread 3 and the male lip 5.

This is why the groove preferably has a limited depth with a thread height and a length which are limited relative to its depth.

A tongue 13 of insufficient radial thickness and axial height lower than the radial thickness could not be supported sufficiently during expansion.

The invention proposes to provide at least one of the faces 7 and 8 with a coating intended to increase the effective area of contact of these faces during radial expansion of the joint and consequently to strengthen the sealing-tightness obtained. For example, by placing on a machined surface of a piece of carbon steel having a roughness Ra, as defined by the norm ISO 4287/1, at most equal to 3.2 μm, a layer of copper, zinc, tin or lead with a thickness of more than 17 μm, a reduction has been obtained in the surface irregularities. Above all, the ductility of the materials used for the coating of a tubular element favors the housing in this coating of the irregularities of the corresponding sealing face of the other tubular element, thus increasing the effective surface areas of contact and consequently improving the sealing-tightness.

Obviously, the coating must be adhesive, i.e. not detach itself from the substrate by friction. The material must be selected according to that of the substrate so as not to cause corrosion by galvanic coupling. The copper may be used on steels with a chromium content at least equal to 10% and on alloys of nickel, and zinc on non-alloyed or slightly alloyed steels. Tin can be used also. Lead can only be used in cases where its toxicity is not important.

The deposit can be carried out by any process for supplying an adhesive and uniform coating, e.g. by electrolytic deposition by immersion, by electrolytic deposition with a buffer, or chemical deposition.

The coating may comprise plural layers, if necessary of different materials, the outer layer being then the most ductile. The layer in contact with the substrate can be a very thin layer for adhering.

Figure 12:
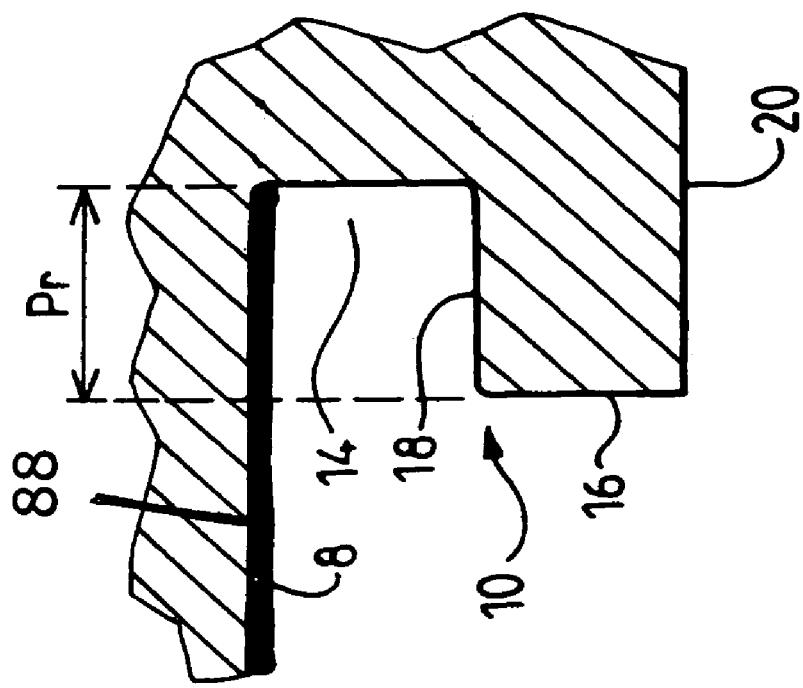
FIGS. 11 and 12 show on a larger scale the lip and the housing shown in FIGS. 2 and 3 respectively with coatings on their respective faces.
Figure 11:
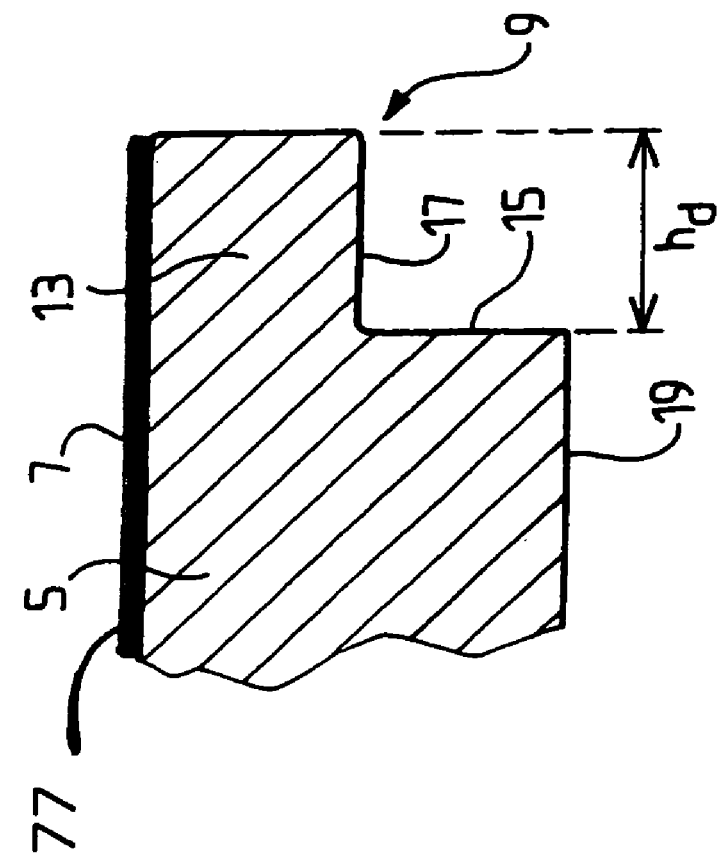

The coating may be present on both tubular elements, or on only one of them, in particular the male element. As shown in FIG. 11, coating 77 is applied to face 7 of male lip 5. As shown in FIG. 12, coating 88 is applied to face 8 of housing 6.

As is known per se, in order to avoid dissymetry in the forming of threads and consequently a decrease in the mechanical strength of the joints, due to the fact that the respectively outer and inner diameters of the tubes are not concentric when they emerge from manufacture before threading, expansion of the outer diameter can be carried out before threading, starting from the free end of the female element and extending over all or part of the length of the thread to be formed.

In a similar manner, it is possible to reduce the inner diameter in the region of the end of the male element by a necking process carried out before machining.

The expansion and necking can be carried out with a constant diameter, or with an increasing diameter for the female element, and a decreasing diameter for the male element, in the direction of the end.

Embodiment

Tubes with an outer diameter DE 139.7 mm and a nominal thickness and 7.72 mm (5.5 in×17.00 lb/ft) of carbon steel treated for a minimum yield strength of 290 MPa (42 KSI):

The chemical composition of the steel and its heat treatment are adapted to obtain the highest properties of ductility possible and more particularly high distributed elongation before reduction of area AR during the tension test (AR higher than or equal to 15% for example).

For example a steel is selected with a sufficiently low carbon content, close to 0.14% (by weight), with a relatively high manganese content of about 1% and comprising an addition of aluminium capable of fixing the residual nitrogen in the steel.

A content of Al of 0.035% for a nitrogen content of 0.010% is completely suitable to the extent that the steel is heat treated by annealing or quenching followed by tempering in order that the addition of Al is in fact adequate to fix the nitrogen. Other chemical elements known for fixing nitrogen can also be used together with or instead of aluminium.

Such a chemical composition, which aims to eliminate the content of free interstitial atoms such as those of nitrogen further make the steel insensitive to the negative property of ageing after strain hardening, which also causes the ductility to deteriorate.

The steel may be in the annealed state (normalising annealing or stress-relief annealing after cold working for example) or in a structurally equivalent state.

An alloyed or martensitic steel with a high content of chromium can be at the quenched and tempered state or normalised and annealed state. An austenitic or duplex stainless steel or a nickel alloy can be in the overhardened state.

Integral threaded joints according to the invention:
tapering threads 3, 4 (conicity=12.5% at the diameter) with trapezoidal threads of radial height 1 mm and axial pitch of 4 mm
cylindrical male lip 5
male lip thickness $e_l$ of 3.2 mm (41% of the thickness of the tube) length $l_l$ of the male lip=11.5 mm
groove 21 with depth $h_g$ of 1 mm and length $l_g$ of 4 mm between the male threaded end 3 and male lip 5
male end face 9 with a tongue 13 of axial height of 1.8 mm and radial thickness of 1.8 mm
face 7 of the male lip covered with an adhesive layer of zinc of a thickness of 50 μm, obtained by electric deposition with buffer
tensile strength of the threaded joint ≧50% of the tensile strength of each of the tube bodies 11, 12.
Results after expansion of the string of tubes:
outer diameter of the tubes 11, 12=157.5 mm (6.2 in)
thickness of tubes: 7.2 mm
yield strength of tubes ≧415 MPa (60 KSI)
hardness ≦22 HRc (NACE specifications MR 01 75 maximum value)
passages satisfying the following tests carried out in the expanded state and in the expanded and aged state
explosion test under internal pressure
collapse test under external pressure
Charpy V test for withstanding impacts
SSC test for resistance to cracking due to $H_2S$ (SSC: sulphide stress cracking) according to NACE specification TM 01-77
NB: NACE=National Association of Corrosion Engineers (USA)

Although the invention has been described in detail with relation to a threaded joint for drilling wells intended to undergo radial expansion, the invention is not limited to such an application and may be implemented wherever the faces must be in mutual sealing-tight contact after relative displacement, brought about in particular by expansion.

Furthermore, the coating according to the invention may be applied advantageously to the sealing faces of the joints described in the following patent applications, registered in the name of the Applicants the same day as the present application:

"Sealing-tight tubular threaded joint improved after diametric expansion", relating to a joint whose two tubular elements comprise faces of mutual sealing-tight contact each interposed between two threaded sections;

"Tubular threaded joint with improved sealing-tightness after plastic expansion", relating to a joint whose two tubular elements have respective inclined shoulders located opposite one another and capable of coming into mutual sealing-tight contact in particular after radial expansion of the joint.

The invention claimed is:

1. An expandable tubular joint comprising:
a first tubular element made of a first material, the first tubular element having a first region with a first sealing surface; and
a second tubular element made of a second material, the second tubular element having a second region with a second sealing surface,
wherein said first and second elements are configured to be connected together so that said first region of the first tubular element is inserted in said second region of the second tubular element,
wherein said expandable tubular joint has a first state in which said first and second tubular elements are disposed so that said first and second sealing surfaces do not contact each other, and a second state in which said first and second sealing surfaces are placed into mutual sealing-tight contact,
said expandable tubular joint being expandable by radial plastic deformation of said first and second tubular elements, so as to permanently pass from said first state to said second state,
wherein said expandable tubular joint further comprises a first coating adhesively attached to said first sealing surface, said coating comprising a material that is more ductile than the second material of said second sealing surface and having a thickness greater than 17 μm, said first coating being configured to increase an effective contact area of between said first and second sealing surfaces when said tubular joint is in said second state,
wherein the first and second tubular elements are configured to be connected together by screwing of a male thread of the first tubular element into a female thread of the second tubular element,
wherein the first region comprises an annular part having a projecting stop face and the second region has a housing, homologous to the annular part, having a receding stop face, the two stop faces being configured during assembly to control screw torque of the male and female threads one on to the other and to insert the first region into the second region, and
wherein an outer peripheral face of the annular part is disposed with a clearance from an inner peripheral face of the housing.

2. An expandable tubular joint comprising:
a first tubular element made of a first material, the first tubular element having a first region with a first sealing surface; and
a second tubular element made of a second material, the second tubular element having a second region with a second sealing surface,
wherein said first and second elements are configured to be connected together so that said first region of the first tubular element is inserted in said second region of the second tubular element,
wherein said tubular joint further comprises a first coating adhesively attached to said first sealing surface, said coating comprising a material that is more ductile than the second material of said second sealing surface and having a thickness greater than 17 μm, said first coating being configured to increase an effective contact area of between said first and second sealing surfaces when said tubular joint is in said second state,
wherein the first and second tubular elements are configured to be connected together by screwing of a male thread of the first tubular element into a female thread of the second tubular element,
wherein the first region comprises an annular part having a projecting stop face and the second region has a housing, homologous to the annular part, having a receding stop face, the two stop faces being configured during assembly to control screw torque of the male and female threads one on to the other and to insert the first region into the second region,
wherein an outer peripheral face of the annular part is disposed with a clearance from an inner peripheral face of the housing,
wherein the first and second sealing surfaces respectively belong to an outer peripheral face of the annular part and to an inner peripheral part of the housing, and
wherein the second material of said second sealing surface is steel or nickel alloy, and the more ductile material is selected from the group consisting of copper, lead, zinc, tin, and their alloys.

* * * * *